United States Patent Office 2,803,785
Patented Aug. 20, 1957

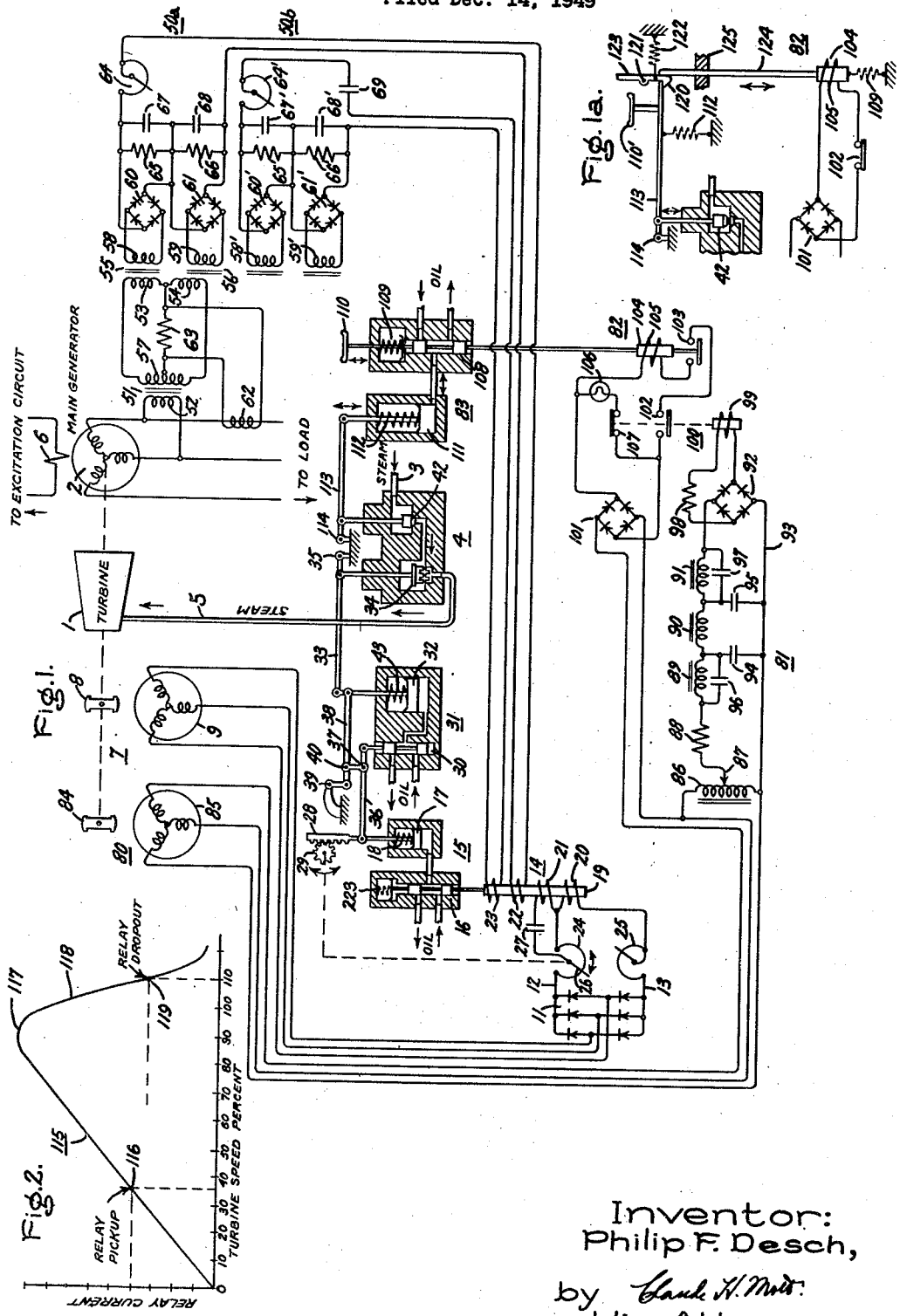

2,803,785

CONTROL SYSTEM FOR A PRIME MOVER

Philip F. Desch, Schenectady, N. Y., assignor to General Electric Company, a corporation of New York Application December 14, 1949, Serial No. 132,848

9 Claims. (Cl. 317—19)

My invention relates to power systems of the type wherein a prime mover, such as a turbine or the like, is arranged to drive a dynamoelectric machine to supply power to an electrical load. More particularly, my invention relates to regulating and protective apparatus for such power systems.

In the past few years, in order to effect reductions in the size and weight of electrical apparatus for certain applications, there has been a trend toward employing higher electrical system frequencies than have heretofore been in common use and to employ generators and prime movers operating at substantially higher speeds than heretofore. An example of the trend toward higher frequencies is the increasing use of 400 cycles per second as the system frequency in auxiliary power systems for aircraft, seagoing vessels, and the like. To provide a frequency of 400 cycles in a power system, a two-pole generator may be directly driven by a prime mover at a speed of 24,000 revolutions per minute, as compared with a maximum two-pole speed of 3600 revolutions per minute in a conventional 60-cycle system.

While such an increase in operating speed generally permits a substantial reduction in the size and weight of generating apparatus, certain difficulties frequently are present in the operation of prime movers at relatively high speeds. One such difficulty is to provide a speed-governing device having the required characteristics to maintain the speed of the prime mover substantially constant at the normal operating value thereof under widely and rapidly varying conditions of generator load. In many cases the governing of high-speed prime movers tends to be inherently difficult due to the relatively small masses of the moving elements thereof, and it is desirable, therefore, to provide a governor having a particularly high degree of sensitivity and rapidity of response.

Should two or more generators of the alternating current type, driven by their respective prime movers, be operated in parallel relation, an additional requirement may be imposed on the respective governing systems. In particular, at relatively high system frequencies the synchronizing torques available in the various generators to maintain synchronism therebetween tend to be substantially less than the torques experienced at lower frequencies. Hence the governors are preferably provided with characteristics which materially assist in maintaining synchronism between the various generators and, in addition, provide for division of the total system load between the various prime movers in proportion to their respective load-carrying capabilities.

It is well known that in the operation of various types of prime movers an emergency overspeed governor is generally employed in conjunction with the regular speed-controlling governor to provide protection against overspeeding of the prime mover in the event of failure of the speed-controlling governor. In the case of a turbine, for example, various centrifugal tripping devices of well known types are frequently employed to arrest the flow of incoming steam and stop the turbine in the event of overspeeding thereof.

While centrifugal devices are generally satisfactory at relatively low speeds, at relatively high speeds it becomes increasingly difficult to provide reliability and accuracy therein. It has been found, therefore, that there is a definite need for an improved type of overspeed governor which is particularly suitable for use at relatively high prime mover speeds.

It is a principal object of my invention to provide a new and improved governing system for prime movers in electric power systems.

It is another object of my invention to provide for prime movers a new and improved governing system wherein the interrelated functions of speed control and overspeed protection are included.

It is a further object of my invention to provide for a prime mover having its speed regulated by a speed-controlling governor, an overspeed protective governor of new and improved form which is particularly suitable for use at relatively high prime mover speeds, but which is not limited to such speeds.

It is a still further object of my invention to provide for prime movers arranged to drive electric generators, a new and improved governing apparatus having incorporated therein load-responsive elements making the governor particularly suitable for maintaining synchronism between two or more generators operating in parallel relation although the inherent generator synchronizing torques may be relatively small.

According to my invention I provide a governing system including a speed-controlling governor having load-responsive elements incorporated therein, and an overspeed protective governor to limit the maximum prime mover speed and interrupt the flow of energy thereto in the event of failure of the speed-controlling governor. In particular, the system is illustrated in terms of a steam turbine arranged to drive an alternating current generator, but it will be understood that the system, with modifications. is equally applicable to other types of prime movers arranged to drive either direct or alternating current generators.

To make the governing system of my invention responsive to prime mover speed, use is made of a speed-responsive regulating apparatus of the type described and claimed in U. S. Patent No. 2,390,084 granted December 4, 1945, upon an application of Martin A. Edwards and assigned to the same assignee as the present application. A tachometer generator is driven at a speed proportional to the prime mover speed and the output current thereof is rectified and supplied to one coil of a multiple-coil solenoid which is arranged to actuate a control valve in a hydraulic servo-mechanism.

The servo-mechanism is in turn arranged to actuate a throttle valve to control the flow of energy to the prime mover. Thus, action of the hydraulic control valve in response to motion of the solenoid, due to signal current therein, is effective to control the supply of high pressure oil to the servo-mechanism to regulate the prime mover speed.

To make the speed-controlling governor responsive to electrical load conditions in the generator, use is made of a watt-responsive circuit to provide a signal in a coil of the solenoid to exert a controlling action on the servo-mechanism in response to generator load. A preferred type of watt-responsive circuit is that described and claimed in U. S. Patent No. 2,388,527 granted November 6, 1945, upon an application of Frederick E. Crever and assigned to the same assignee as the present application.

By employing a watt-responsive circuit in an arrangement to detect variations in load, the speed-controlling governor is made responsive to such load variations as well as steady-state load conditions. The speed-controlling governor is thus provided with load-anticipating characteristics to cause actuation of the servo-mechanism and throttle valve in response to load variations prior to changes in speed resulting therefrom which normally actuate the governor.

While the speed-controlling apparatus of the invention is intended to function normally at all times and generally to possess a high degree of reliability, nevertheless emergency or other abnormal conditions may cause faulty operation thereof, thereby causing overspeeding of the prime mover with accompanying danger of damage thereto. To protect the prime mover and apparatus associated therewith, I provide an overspeed protective governor which operates in close relation with the above-described speed-controlling governor.

To make the overspeed governor responsive to speed, a tachometer generator is driven at a speed proportional to the prime mover speed, the tachometer output voltage and frequency thus being proportional to prime mover speed. The tachometer output is passed through a resonant circuit the impedance characteristic of which is such that under conditions of increasing frequency, representing increasing speed, a decreasing current is obtained in a particular frequency range. This decrease in current is employed to actuate a sensitive electromagnetic relay. The relay is employed to actuate a solenoid which in turn controls a sensitive valve in a servo-mechanism. The servo-mechanism is arranged to actuate a shut-off valve to arrest the flow of steam to the prime mover when the valve is in a closed condition. While in the illustrated embodiment actuation of the relay is employed to control a solenoid-operated hydraulic servo-mechanism, other actuating mechansms, such as a solenoid-operated mechanical tripping device, may equally well be controlled thereby.

For a more complete understanding of my invention, together with other objects and advantages thereof, attention is now directed to the following detailed description taken in conjunction with the accompanying drawing, and to the appended claims in which the features of the invention believed to be novel are more particularly pointed out. In the drawing Fig. 1 is a schematic diagram of a preferred embodiment of my invention; Fig. 1a is a modification of a portion of the arrangement shown in Fig. 1; and Fig. 2 is a curve showing certain operating characteristics of the arrangement of Fig. 1.

Referring now to Fig. 1, there is shown a power system comprising principally a prime mover 1, represented as a steam turbine, a dynamoelectric machine 2 arranged to be driven by turbine 1, and an associated speed control system. Turbine 1 is supplied with energy from a source 3 of high pressure steam through a suitable valve mechanism 4 and steam connections 5 leading from mechanism 4 to turbine 1.

Thermal energy supplied to turbine 1 is converted to mechanical energy therein to drive generator 2. Generator 2, which is represented as a three-phase alternating current generator, in turn converts mechanical driving energy to electrical energy to be supplied to an electrical load (not shown). Generator 2 has a field exciting winding 6 which may be connected to any conventional type of excitation system to provide desired excitation characteristics for generator 2.

The normal operating speed of turbine 1 is regulated by a speed controlling governor of the type disclosed and claimed in the above-mentioned Edwards patent. In particular, the speed of turbine 1 is measured by a tachometer generator 7 driven at a speed proportional to the speed of turbine 1. Tachometer 7, which is preferably of the permanent-magnet field excitation type, is provided with a permanent-magnet rotor 8, and a three-phase stator 9. Since rotor 8 has a substantially constant field strength and is driven at a speed proportional to the speed of turbine 1, tachometer 7 has an output voltage and frequency which are likewise proportional to the speed of turbine 1.

The output voltage of tachometer 7 is impressed on a three-phase full-wave rectifier 11, preferably of the selenium type. The direct current output of rectifier 11, which appears across terminals 12 and 13 thereof, is employed to actuate an electromagnetic solenoid device 14, which in turn controls the action of a servo-mechanism 15 to control the flow of steam to turbine 1 through valve mechanism 4.

Servo-mechanism 15 which is of a conventional type comprises a sensitive control valve 16 and a power piston 17, the latter being of the single-acting type opposed by a spring 18. High pressure oil from a suitable source, such as a motor-driven oil pump (not shown) is supplied to piston 17 through control valve 16. Relatively small movement of valve 16 effected by a small force acting thereon causes relatively large movment of piston 17 which is capable of exerting a substantially increased force. It will be understood that servo-mechanism 15 is, in effect, a force and motion amplifier employing hydraulic fluid under pressure as the amplification medium.

Solenoid 14 comprises a magnetic armature 19 and a suitable magnetic structure (not shown) whereon are provided a plurality of windings 20, 21, 22, and 23. Armature 19 is mechanically connected to valve 16 so that motion of armature 19 causes corresponding motion of valve 16. Magnetic forces in solenoid 14 caused by currents in the various windings thereof are opposed by a biasing spring 223.

Winding 20, which is the principal speed-controlling winding of solenoid 14, is connected in the circuit of tachometer 7 and rectifier 11. One end of a stabilizing rheostat 24 is connected to output terminal 12 of rectifier 11, and the other end of rheostat 24 is connected to one end of winding 20. The other end of winding 20 is connected in series with a speed-adjusting rheostat 25 to output terminal 13 of rectifier 11. Thus, a unidirectional current may be caused to circulate through rheostat 24, winding 20 and rheostat 25 by the voltage output of rectifier 11.

Winding 21 of solenoid 14 is a stabilizing or anti-hunt winding, one end of which is connected to the junction of winding 20 and stabilizing rheostat 24. The other end of winding 21 is connected to movable arm 26 of rheostat 24 through a stabilizing capacitance 27. Movable arm 26 is arranged to be driven in response to motion of piston 17, and may be driven through any suitable mechanism such as a rack and pinion. A rack 28 is suitably connected to a piston 17 and a mating pinion 29 is connected to arm 26 so that motion of piston 17 and rack 28 causes rotation of arm 26.

In some cases the degree of motion and force available from piston 17 may be employed directly to actuate a throttle valve to control the supply of an energy-containing medium to a prime mover. Such is generally the case in an internal combustion engine employing a carburetor wherein the governor is required to actuate only a butterfly valve requiring relatively little force. However, in the case of a turbine, relatively high degrees of motion and force are generally required to actuate the steam throttle valve. Accordingly it has been found that a single servo-mechanism is frequently inadequate and in such cases it is desirable to provide a second servo-mechanism actuated by the first mechanism in a double-relay arrangement. Such an arrangement is shown in Fig. 1.

In particular, motion of piston 17 is employed to actuate a control valve 30 in a secondary servo-mechanism 31. High pressure oil, which may be supplied from the same source as servo-motor 15, is supplied to a piston 32 of servo-mechanism 31 through valve 30. Since a relatively high degree of force is available from piston 17, control valve 30 may be made to control a relatively large flow of oil to piston 32. The latter, therefore, may be made relatively large and capable of exerting forces of sufficient magnitude to actuate a steam throttle valve 34 in valve mechanism 4. Piston 32 is connected to valve 34 through a lever 33, one end of which is connected to a fixed pivot 35. Valve 34 is arranged to be moved from a substantially closed position to a maximum open position by motion of piston 32.

Motion of piston 17 is transferred to control valve 30 through a lever 36 about a movable pivot 37. Pivot 37 is moved in accordance with motion of piston 32 through a lever 38 which is connected by a link to a fixed pivot 39 and to which pivot 37 is connected by a link at a point 40. It will be understood that the system of levers described functions to provide a conventional "follow-up" action between motion of piston 32 and control valve 30. Such follow-up action serves to stabilize motion of piston 32 with respect to motion of piston 17 and control valve 30.

It will be helpful in understanding the complete control system to describe the operation of the speed-controlling governor before proceeding with the description of the other portions of the system.

Valve mechanism 4 includes, in addition to throttle valve 34, a tripping or shut-off valve 42 connected in series relation with valve 34 and arranged to shut off the flow of steam from source 3 under certain conditions, as will be hereinafter described. It is first assumed that tripping valve 42 is maintained in an open condition and that, accordingly, control of the flow of steam from source 3 to turbine 1 is effected by actuation of throttle valve 34. It is further assumed that the supply of steam from source 3 may be controlled through a suitable manual throttle valve (not shown) by an operator in bringing turbine 1 gradually from standstill to the speed at which the speed-controlling governor becomes operative.

At standstill the voltage output of tachometer 7 is zero and no current is circulated in winding 20 of solenoid 19. Accordingly no force is exerted by solenoid 19 and control valve 16 is forced by spring 223 to a position to cause oil under pressure to be supplied to piston 17, which is forced to the extremity of its travel against the opposing force of spring 18. Control valve 30 is moved by piston 17 to a position to cause oil under pressure to be supplied to piston 32, which is forced to the extremity of its travel against the opposing force of a spring 43, thereby moving valve 34 to its maximum open position. Thus it will be seen that when turbine 1 is at standstill, valve 34 is maintained open by action of the speed-controlling governor and the supply of steam to turbine 1 during starting may be controlled through the above-mentioned manual valve.

As the speed of turbine 1 and tachometer 7 increases from standstill, a current is circulated in winding 20 causing a force to be exerted by armature 19 to move valve 16 against the opposing force of biasing spring 223. Valve 16, under steady-state conditions, is positioned to permit sufficient leakage of oil thereby to provide the pressure required to maintain piston 17 at its operating position against the force of spring 18. While obviously valve 16 must be moved slightly to obtain variations in pressure on piston 17, by suitable design such movement may be made extremely small. For practical purposes, therefore, it may be considered that valve 16 operates at a fixed point for all steady-state conditions of speed and load of turbine 1. Accordingly, a substantially constant force is required to maintain valve 16 in its operating position against the force of spring 223.

To provide such a constant force the normal operating current in winding 20 must be substantially constant under all steady-state conditions when the speed-controlling governor is functioning to control the speed of turbine 1. The governing speed for a particular setting of speed-adjusting rheostat 25 is determined by the speed required to circulate the normal operating current in winding 20. Since the resistances of the various elements in the speed-controlling circuit are fixed, with the exception of speed-adjusting rheostat 25, the minimum governing speed is obtained at the minimum setting of rheostat 25. Once the minimum governing speed has been reached, the turbine operating speed may be increased by increasing the resistance setting of rheostat 25.

A tendency of turbine 1 to slow down due to increase in load thereon or drop in steam pressure causes a reduction in the voltage output of tachometer 7 with an accompanying decrease in the current in winding 20. This decrease in current results in a reduction in the force of armature 19 causing valve 16 to be moved by biasing spring 223. The relationship of servo-mechanisms 15 and 31 and the system of levers associated therewith is such that under a condition of decreasing speed steam valve 34 is opened to admit more steam to return the speed of turbine 1 to the set value. As the speed is increased, the current in winding 20 is likewise increased causing an increase in the force in armature 19 sufficient to oppose spring 223 to return valve 16 to its normal operating position.

Due to the time lags in various elements of the speed-controlling governor an anti-hunting or stabilizing action is provided to prevent hunting conditions which would otherwise tend to exist. Such stabilizing action is provided by introducing a transient signal in winding 21 of solenoid 14. The current normally flowing through winding 20 also flows through rheostat 24 causing a voltage to exist thereacross. A portion of this voltage is tapped by arm 26, which is driven in response to motion of piston 17, and is impressed on capacitance 27 through winding 21. Under steady-state conditions arm 26 is stationary and capacitor 27 is charged to the voltage between arm 26 and the junction of winding 21 and rheostat 24.

Under transient conditions when piston 17 is moved arm 26 is likewise moved and the voltage impressed on capacitor 27 is caused to vary. Capacitor 27 is charged or discharged depending on its previous state of charge and a transient current is made to flow therein. This current also flows in winding 21 and serves to oppose changes in the magnetic flux in solenoid 14 due to changes in the current in winding 20 resulting from variations in the speed of turbine 1. Thus a stabilizing action is obtained which is effective in preventing hunting conditions from developing in the turbine and speed-controlling governor.

It will be understood that the system as thus far described is responsive only to the speed of turbine 1 as sensed by tachometer 7. The action of the speed-controlling governor may be considered for all practical purposes to be substantially isochronous, or in other words, the speed of turbine 1 is maintained substantially at the desired value, as determined by the setting of rheostat 25, under all conditions of turbine load and steam pressure within the capabilities of turbine 1.

While isochronous operation of a prime mover such as a turbine 1 may be desirable under certain conditions, it may be desirable under some conditions to provide a definite speed regulation or change of governed speed with variation in prime mover load. This is particularly the case if a number of generators, driven by their respective prime movers, are to be operated in parallel relation, to aid in securing suitable division of the load between the various prime movers. Speed regulation in proportion to the real power load supplied by a generator and imposed on a prime mover may be conveniently introduced into a speed-controlling governor of the type described above by the use of a watt-responsive circuit having an output voltage proportional to the electrical load, to modify the action of the electromagnetic element of the governor.

Attention is now directed to a pair of watt or load-responsive circuits, indicated generally by numerals 50a and 50b, having steady-state and transient functions respectively. Load-responsive circuit 50a includes a voltage-responsive circuit which comprises a potential transformer 51 having a primary winding 52 excited by one phase voltage of generator 2. The primary windings 53 and 54, respectively, of a pair of auxiliary transformers 55 and 56 are connected in series relation across the terminals of secondary winding 57 of transformer 51. Secondary windings 58 and 59, respectively, of transformers 55 and 56 are connected to the input terminals of a pair of full-wave rectifiers 60 and 61 which may be of the selenium type. The circuit as thus far described is a voltage-responsive circuit in which the alternating current voltages supplied to the input terminals of rectifier 60 and 61 are equal in magnitude but opposite in polarity.

A voltage component proportional to the current output of generator 2 is introduced into the load-responsive circuit by the use of a current transformer 62 and a resistance 63 which is connected between the midpoint of winding 57 and the common point of the primary windings 53 and 54. The voltage impressed across resistance 63 is added vectorially to the voltage impressed on the input terminals of rectifiers 60 and 61. The output terminals of rectifiers 60 and 61 are connected in series and opposed in polarity and are connected to winding 22 of solenoid 19 through an adjustable resistance 64. A pair of resistances 65 and 66 are connected in shunt relation with rectifiers 60 and 61 respectively. A pair of capacitors 67 and 68 are likewise connected in shunt relation with rectifiers 60 and 61 to impart a smoothing effect to the direct current output of the rectifiers.

Load-responsive circuit 50b is generally similar to circuit 50a and the elements of circuit 50b are similarly numbered with prime numerals. For convenience secondary windings 58' and 59' may be additional windings on transformers 55 and 56 respectively. The combined direct current output of rectifiers 60' and 61' is impressed on winding 23 of solenoid 19 through rheostat 64' and a capacitance 69, the addition of the latter being the principal difference between circuits 50a and 50b. It will be understood that load-responsive circuit 50a is similar to the circuit described and shown in the Crever Patent No. 2,388,527 and that circuit 50b is also similar to the circuit of the Crever patent but with the addition of a capacitance for transient effects as will be described.

The principal function of circuit 50a is to provide a signal in winding 22 in proportion to the real power supplied by generator 2 to a load. In the operation of circuit 50a a phase voltage of generator 2 is supplied to primary 52 of transformer 51, and through transformers 55 and 56 equal voltages are supplied to rectifiers 60 and 61, the outputs of which are connected to be subtractive or differential. In order to measure real power or watts load supplied by generator 2, a signal proportional to the current supplied thereby is vectorially added to one and subtracted from other of the voltage signals across the primaries 53 and 54 respectively, of transformers 55 and 56.

It will, therefore, be understood that when generator 2 is operating at no load or under a zero power factor load the voltage component proportional to load current has no in-phase or real power component and under this condition the voltages in transformers 55 and 56 are vectorially equal causing the output voltages of rectifiers 60 and 61 to be equal and in opposition, so that no current flows in winding 22 of solenoid 19. However, if real power is being supplied by generator 2 a voltage having an in-phase component is impressed on resistance 63 caused by the flow of load current in current transformer 62. This voltage component is additive vectorially in one of transformers 55 and 56 and subtractive vectorially in the other transformer. Consequently a direct current proportional to the difference of these voltages exists in the circuit of winding 22, causing a modification in the total flux of solenoid 19.

Generally it is desirable to cause a reduction in governed speed with an increase in load, as for paralleling purposes. To secure a reduction in governed speed the flux provided by winding 22 is made additive with the flux provided by winding 20 so that a reduced current is required in winding 20 to provide the total flux required to balance spring 223, permitting a reduction in the speed of tachometer 7 and turbine 1 to provide this current. The effect of winding 22 in providing speed regulation may be varied by adjusting the setting of rheostat 64. It will be understood that should it be desirable to cause an increase in governed speed with an increase in load the effect of winding 22 may be reversed by reversing the flow of current therethrough.

The operation of load-responsive circuit 50b is generally similar to the operation of circuit 50a except that steady-state current is prevented from flowing in winding 23 due to the presence of capacitance 69. The combined output voltage of rectifiers 60' and 61' is impressed on capacitance 69 through winding 23 causing transient signal currents to flow therein as capacitance 69 is charged and discharged in response to transient load conditions in generator 2. Such signal currents, which are introduced into winding 23 on solenoid 14 to act in the same sense as the current in winding 20, are employed to cause the speed-controlling governor to act at an earlier time than would otherwise be the case, to maintain the speed of the prime mover at the governed value.

Since the speed-controlling governor is inherently speed-responsive, action thereof normally does not take place until momentary variations in speed occur in response to variations in load. In addition, a certain response time is present in the governor actuating mechanism which results in a further delay in adjusting the stem throttle valve to changing load conditions. Therefore "overshooting" or "undershooting" of speed generally occur in response to load variations. By the use of a transient load-responsive circuit, such as circuit 50b, sudden changes in load may effectively be anticipated by sensing changes in load and making the speed-controlling governor responsive to such changes. Through such action, which may conveniently be termed "load anticipation," sudden changes in prime mover speed due to relatively severe load changes may be reduced to a minimum.

Attention is next directed to the overspeed protective portion of the control system which comprises principally a tachometer generator 80 arranged to be driven at a speed proportional to the speed of turbine 1, a frequency-responsive circuit 81, an actuating solenoid 82, and a fluid servo-mechanism 83. Tachometer generator 80, which may be similar to tachometer 7, is provided with a permanent-magnet rotor 84 and a three-phase stator 85. Frequency-responsive circuit 81 includes an autotransformer 86 having a variable tap 87, the end terminals of autotransformer 86 being connected across one phase of tachometer 80.

A resistance 88 and a plurality of inductances 89, 90, and 91 are connected in series relation between tap 87 and one input terminal of a full-wave rectifier 92, which may be of the selenium type. The other input terminal of rectifier 92 is connected to one end of autotransformer 86, the connection therebetween being made by means of a conductor 93. A capacitance 94 is connected from the junction of inductances 89 and 90 to conductor 93, and a capacitance 95 is connected from the junction of inductances 90 and 91 to conductor 93. A capacitance 96 is connected in shunt relation with inductance 89, and a capacitance 97 is connected in shunt relation with inductance 91.

The output terminals of rectifier 92 are connected to the series combination of a resistance 98 and the winding 99 of a sensitive electromagnetic relay 100. The function of relay 100 is to control the actuation of solenoid 82 which is supplied with current from another phase of tachometer 80 through a full-wave rectifier 101. The output terminals of rectifier 101 are connected to the series combination of a pair of normally-open contacts 102 of relay 100, a pair of normally-open contacts 103 arranged to be actuated by armature 104 of solenoid 82, and winding 105 of solenoid 82. A signal light 106 is connected in series with a pair of normally-closed contacts 107 of relay 100 across the output terminals of rectifier 101.

Armature 104 is mechanically connected to the control valve 108 of servo-mechanism 83, and is arranged to move valve 108 against the force of a biasing spring 109. A handle 110 is arranged so that the assembly of armature 104 and valve 108 may be manually moved by an operator against spring 109 without the presence of magnetic force in solenoid 82.

Valve 108 is arranged to supply high pressure oil from a source, which may be the same as the source employed for servo-mechanisms 15 and 31, to an operating piston 111 to move piston 111 against the force of a spring 112. Motion of piston 111 is employed to actuate shut-off valve 42, which was previously mentioned in connection with the operation of the speed-controlling governor, through a lever 113 which is connected to a fixed pivot 114. Servo-mechanism 83 is arranged so that when valve 108 is moved to the upper end of its travel, as by the force of solenoid 82, valve 42 is opened to its maximum extent by piston 111. When valve 108 is moved to the lower end of its travel, as by the force of biasing spring 109, valve 42 is closed by piston 111 to cut off the supply of steam to turbine 1 from source 3.

In considering the operation of the overspeed protective control it is again assumed that turbine 1 is at standstill and, further, that the procedure previously described is employed in starting turbine 1. At standstill the voltage output of tachometer 80 is zero and no current flows in frequency-responsive circuit 81 or winding 105. Valve 42, therefore, is closed and steam is not admitted to valve mechanism 4. To open valve 42 for starting purposes, valve 108 may be moved by manipulation of handle 110 to supply oil to piston 111. Manipulation of handle 110 also causes normally-open contacts 103 of solenoid 82 to be closed.

As the speed of tachometer 80 increases an increasing current is caused to flow in winding 99 of relay 100. Referring to Fig. 2 there is shown a curve 115 of the current in winding 99 as a function of turbine speed, to which the frequency output of tachometer 80 is proportional. It will be seen that initially the relay current increases from zero at standstill along a substantially straight line, and that pickup of relay 100 occurs at a predetermined point 116 at a relatively low percentage of rated turbine speed. Beyond this speed sufficient current flows in winding 99 to maintain pickup of relay 100.

When pickup of relay 100 occurs contacts 102 thereof are closed thereby completing the circuit of winding 105 and causing a current to flow therein. The current in winding 105 is sufficient to maintain armature 104 in its fully actuated position, and, therefore, the operator no longer need maintain valve 108 at the upper extremity of its travel since this function is now performed by solenoid 82. A convenient indication of the pickup of relay 100 is given by signal lamp 106 which is deenergized by contacts 107 of relay 100 when pickup of the latter occurs. Following pickup of relay 100 and energization of solenoid 82 the overspeed control is in its normal operating condition and the speed of turbine 1 is controlled by the speed-controlling governor in the manner previously described.

As the frequency output of tachometer 80 increases, due to rising turbine speed, the relay current is modified by the action of frequency-responsive circuit 81 as indicated by curve 115 in Fig. 2. It will be seen that the relay current reaches a maximum value 117 in the vicinity of rated turbine speed and that beyond the maximum point the current decreases rapidly. It is this sharp decrease in current, indicated as region 118 of curve 115, of which use is made in the overspeed protective governor.

In particular, when the turbine speed has reached a desired maximum value, such as 110 percent of rated speed, due for example to faulty operation of the speed-controlling governor, relay 100 is caused to drop out, as indicated at point 119 of curve 115, thereby opening contacts 102 and breaking the circuit of solenoid winding 105. Loss of current in winding 105 results in loss of actuating force of solenoid 82 and valve 108 is moved to the lower extremity of its travel by biasing spring 109. In this position oil pressure is removed from piston 111 and the latter is moved by spring 112 to the lower extremity of its travel, causing valve 42 to be closed. In other words, when the speed of turbine 1 reaches a predetermined maximum value valve 42 is closed in response to dropout of relay 100, thereby cutting off the supply of steam to turbine 1 and causing shut-down thereof. The speed at which dropout of relay 100 occurs may be conveniently adjusted by varying the setting of tap 87 of autotransformer 86.

As the speed of turbine 1 decreases, following closing of valve 42, the current in relay winding 99 initially increases in accordance with region 118 of curve 115 in Fig. 2, causing pickup of relay 100 to occur. Closing of contacts 102 thereof tends to cause reenergization of solenoid 82 and reopening of valve 42. However an interlocking action is provided by contacts 103 actuated by solenoid 82, so that once deenergization thereof has occurred contacts 103 must be reclosed by an operator, or otherwise, to complete the circuit of winding 105 to permit reenergization of solenoid 82. In other words, an inversible "tripping" action of the overspeed protective governor occurs in response to overspeed conditions and a "resetting" operation must be performed by an operator before turbine 1 may be restarted.

While I have shown a fluid servo-mechanism to actuate shut-off valve 42 in response to motion of solenoid 82, it will be obvious that other mechanisms may be employed to actuate valve 42. For example, solenoid 82 may be arranged to actuate a tripping mechanism wherein valve 42 is maintained open by a latching member and is closed by a suitable biasing spring.

Such an arrangement is shown in Fig. 1a which is a partial representation of the overspeed protective governor shown in Fig. 1 including valve 42, armature 104, and an associated mechanical latching and tripping arrangement. As in the case of Fig. 1 valve 42 is connected to a lever 113 one end of which is connected to a fixed pivot 114. Valve 42 tends to be moved to its closed position by a biasing spring 112 connected to lever 113. The other end of lever 113 is arranged to engage a latch 120 which rotates about a fixed pivot 121. A handle 110' is fixed to lever 113 for the purpose of manually opening valve 42.

A biasing spring 122 tends to pull latch 120 away from latching engagement with the end of lever 113. A handle 123, formed by an extension of latch 120 above pivot 121, enables latch 120 to be placed manually in latching engagement with lever 113 by an operator. Armature 104 of solenoid 82 is provided with an extended rod 124 which passes freely through a suitable guide 125. The extremity of rod 124 is arranged to effect slidable engagement with latch 120. The force of armature 104, due to current flowing in coil 105, is in a direction to force rod 124 into engagement with latch 120 against the force of a biasing spring 109.

In operation, valve 42 is first opened by an operator through lifting of handle 110' and lever 113 against the force of biasing spring 112. Biasing spring 122 tends to move latch 120 away from the end of lever 113 and therefore, to effect latching engagement between lever 113 and latch 120, handle 123 is moved in a clockwise direction by the operator against the force of biasing spring 122. Lever 113 is thus maintained by latch 120 in a raised position thereby causing valve 42 to be maintained open, as shown in Fig. 1a.

At low speeds, prior to closing of contacts 102, no current flows in winding 105 to cause actuation of solenoid 82. Handle 123, therefore, must be maintained in its maximum clockwise position by the operator until winding 105 is energized. Energization of winding 105 causes actuation of solenoid 82 and engagement of rod 124 with latch 120 to maintain latching of the latter with lever 113 as shown in Fig. 1a. In the event of overspeed conditions in turbine 1 and opening of contacts 102, winding 105 is deenergized causing rod 124 to be moved away from latch 120, permitting the latter to be moved from latching engagement with lever 113 and valve 42 to be closed by spring 112.

With a latching arrangement of the type shown in Fig. 1a interlocking contacts such as contacts 103 in Fig. 1, actuated by solenoid 82, are unnecessary. Following interruption of current in winding 105, latch 120 is released by rod 124 and moved from latching engagement with lever 113 by spring 122. It is necessary before operation of turbine 1 can be reestablished for an operator to open valve 42 manually and to latch lever 113 in an open position by manually moving latch 120 into engagement therewith, or in other words the tripping mechanism must be "reset." Therefore, reenergization of winding 105 due to reclosing of relay contacts 102 does not tend to open steam valve 42, as in the case of fluid servomechanism 83 shown in Fig. 1, and an irreversible "tripping" action occurs.

In the arrangements of Figs. 1 and 1a there are shown mechanisms for actuating valve 42 which must be maintained, manually or otherwise, in positions corresponding to the open position of valve 42 prior to energization and actuation of solenoid 82. It will be obvious, however, that a tripping mechanism may be employed whereby valve 42 may be mechanically latched in an open position and the latch may be "tripped" by action of solenoid 82 upon deenergization thereof.

A particular feature of the overspeed protective apparatus of my invention is the fail-safe characteristics thereof. Should the flow of current to relay winding 99 be interrupted due to broken connections, open windings in tachometer 80, or other causes, contacts 102 are opened, thereby initiating the sequence of operation effecting the closing of valve 42 and shutting-down of turbine 1. Valve 42 is also closed should the circuits of solenoid winding 105 be similarly interrupted. Another feature of the protective apparatus is that the speed-responsive element thereof, herein embodied by tachometer 80, serves also as the source of power for the apparatus, so that reliance need not be placed on external power sources which may be subject to failure.

From the foregoing it will be seen that my invention as herein shown and described provides an integrated system of control for a prime mover driving an electric generator. The control of the prime mover speed during normal operation is effected by a speed-controlling governor which is responsive not only to variations in prime mover speed, but also to variations in load imposed thereon, to provide a load-anticipating action which is highly effective in reducing transient speed variations to a minimum. Such anticipating action is particularly useful in the case of prime movers wherein the moving elements have relatively little mass and governing is inherently difficult.

The speed-controlling governor is also highly effective, due to its rapidity of response and load-responsive characteristics, in maintaining synchronism between a number of alternating current generators operating in parallel relation. This is particularly useful when the inherent generator synchronizing torques are relatively small, as in the case of relatively high frequency generators. The governor is further effective, due to its load-responsive characteristics, in maintaining equitable division of load between a number of generators operating in parallel.

The control system includes, in addition to the speed-controlling governor, an overspeed protective governor to limit the abnormal speed of the prime mover in the event of faulty operation of the speed-controlling governor. The protective governor is independent of rotating mechanical elements and therefore is particularly adaptable to high-speed prime movers. The protective apparatus possesses a high degree of accuracy and sensitivity and therefore operation thereof may be made to occur at a precise predetermined value of speed, which is of considerable importance in the protection of prime movers operating at extremely high speeds.

It will thus be seen that by the use of a speed control system constructed in accordance with my invention, a high degree of flexibility and reliability may be obtained in the control of both normal and abnormal speeds of a prime mover driving an electric generator.

While I have shown and described a preferred embodiment of my invention, it will be understood that my invention may well take other forms and I, therefore, aim in the appended claims to cover all such changes and modifications as fall within the true spirit and scope of the invention.

What I claim as new and desire to secure by Letters Patent of the United States is:

1. A control system for a prime mover having valve means to vary the supply of an energy-containing medium thereto and a dynamoelectric machine driven by said prime mover and arranged to supply power to an electrical load, comprising regulating means to maintain the normal operating speed of said prime mover substantially at a first predetermined value including electromagnetic means responsive to the speed of said prime mover and means responsive to said electromagnetic means to actuate said valve means, means responsive to said load and connected to said electromagnetic means to vary said first predetermined value, means responsive to variations in said load and connected to said electromagnetic means to oppose momentarily changes in said normal speed due to variations in said load, and means to limit the abnormal speed of said prime mover comprising a dynamoelectric machine having an output voltage and frequency responsive to said speed, a tuned circuit having a current therein responsive to said output, electromagnetic means responsive to said current, and means responsive to said second electromagnetic means to arrest the supply of said energy-containing medium to said prime mover at a second predetermined value of said speed.

2. A control system for a prime mover having valve means to vary the supply of an energy-containing medium thereto and a dynamoelectric machine driven by said prime mover and arranged to supply power to an electrical load, comprising regulating means to maintain the normal operating speed of said prime mover substantially at a first predetermined value including electromagnetic means responsive to the speed of said prime mover and means responsive to said electromagnetic means to actuate said valve means, means responsive to said load and connected to said electromagnetic means to vary said first predetermined value, means responsive to variations in said load and connected to said electromagnetic means transiently to oppose momentary changes in said normal speed due to variations in said load, and means to limit the abnormal speed of said prime mover comprising a dynamoelectric machine having an output voltage and frequency responsive to said speed, a tuned circuit having a current therein responsive to said output, first electromagnetic means responsive to said current, second electromagnetic means responsive to said first electromagnetic means, means responsive to said second electromagnetic means to arrest the supply of said energy-containing medium to said prime mover at a second predetermined value of said speed, and interlocking means to maintain said arrestment following occurrence thereof.

3. A control system for a prime mover having valve means to vary the supply of an energy-containing medium thereto and a dynamoelectric machine driven by said prime mover and arranged to supply power to an electrical load, comprising regulating means to maintain the normal operating speed of said prime mover substantially at a predetermined value including electromagnetic means responsive to the speed of said prime mover and means responsive to said electromagnetic means to actuate said valve means, means responsive to said load and cooperative with said electromagnetic means to vary said predetermined value, and means transiently responsive to variations in said load and cooperative with said electromagnetic means to oppose momentarily changes in said normal speed due to variations in said load.

4. In a control system for a prime mover having valve means to vary the supply of an energy-containing medium thereto and means to regulate the normal operating speed of said prime mover by actuation of said valve means, protective means operative at a predetermined abnormal speed of said prime mover to arrest the supply of said medium by actuation of said valve means, said protective means comprising a dynamoelectric machine having an output voltage and frequency responsive to the speed of said prime mover, a tuned circuit connected to said output and having a current therein responsive to said voltage and said frequency, said current decreasing with an increase in speed in the vicinity of said abnormal speed, electromagnetic means responsive to a predetermined value of said current, and means responsive to said electromagnetic means to actuate said valve means to arrest the supply of said energy—containing medium to said prime mover.

5. In a control system for a prime mover having a throttle valve to vary the supply of an energy-containing medium thereto and regulating means to maintain the normal operating speed of said prime mover substantially constant at a predetermined value by actuation of said valve, overspeed protective means operative at a predetermined maximum speed to arrest the flow of said medium to said prime mover comprising a dynamoelectric machine having an output voltage and frequency proportional to the speed of said prime mover, a tuned circuit connected to said output and having a current therein responsive to said output, said circuit having a resonance characteristic whereby said current decreases as said frequency increases in the vicinity of said predetermined maximum speed, first electromagnetic means arranged to be deenergized at a predetermined value of said current corresponding to said predetermined maximum speed, second electromagnetic means responsive to said first electromagnetic means, a shut-off valve in series relation with said throttle valve, biasing means to close said shut-off valve, a fluid servomotor arranged to be actuated by said second electromagnetic means and to oppose said biasing means to maintain said shut-off valve open at normal speeds of said prime mover, said opposition being removed at said predetermined maximum speed to cause said shut-off valve to be closed to arrest the flow of said medium, and interlocking means to prevent opening of said shut-off valve following closing thereof.

6. An overspeed protective governor for a prime mover to arrest the flow of an energy-containing medium thereto at a predetermined maximum speed thereof, comprising a dynamoelectric machine having an output voltage and frequency proportional to the speed of said prime mover, a tuned circuit connected to said output and having a current therein responsive to said output, said circuit having a resonance characteristic whereby said current decreases as said frequency increases in the vicinity of said predetermined maximum speed, first electromagnetic means responsive to predetermined minimum and maximum values of said current corresponding respectively to a predetermined minimum and said predetermined maximum values of said speed, second electromagnetic means responsive to said first electromagnetic means, a shut-off valve through which said medium flows to said prime mover, biasing means to close said shut-off valve, means to maintain said shut-off valve open at speeds of said prime mover below said predetermined minimum speed, means cooperative with said second electromagnetic means to maintain said shut-off valve open between said predetermined minimum and maximum speeds against said biasing means, closing of said shut-off valve being effected at said predetermined maximum speed, and means to maintain said valve closed following said closing.

7. An overspeed protective governor for a prime mover to arrest the flow of an energy-containing medium thereto at a predetermined maximum speed thereof, comprising a dynamoelectric machine having an output voltage and frequency proportional to the speed of said prime mover, a tuned circuit connected to said output and having a current therein responsive to said output, said circuit having a resonance characteristic whereby said current decreases as said frequency increases in the vicinity of said predetermined maximum speed, first electromagnetic means responsive to predetermined minimum and maximum values of said current corresponding respectively to a predetermined minimum and said predetermined maximum values of said speed, second electromagnetic means responsive to said first electromagnetic means, a shut-off valve through which said medium flows to said prime mover, means to effect opening of said shut-off valve at speeds of said prime mover below said predetermined minimum speed, means cooperative with said second electromagnetic means to maintain said shut-off valve open between said predetermined minimum and maximum speeds, and biasing means to effect closing of said shut-off valve, said closing being effected at said predetermined maximum speed.

8. A control system for a prime mover having valve means to vary the supply of an energy-containing medium thereto and a dynamoelectric machine driven by said prime mover and arranged to supply power through an electrical circuit to an electrical load, comprising regulating means to maintain the normal operating speed of said prime mover substantially at a predetermined value including electromagnetic means responsive to the speed of said prime mover and fluid motor means responsive to said electromagnetic means to actuate said valve means, circuit means responsive to said load and connected to affect said electromagnetic means for varying said predetermined value, said load responsive means comprising means for deriving voltage and current signals responsive respectively to the voltage and current in said electrical circuit and means for combining these signals to produce a single signal responsive to the power supplied to said electrical load, and circuit means transiently responsive to variations in said load and connected to affect said electromagnetic means for momentarily opposing changes in said normal speed due to variations in said load, said transiently responsive circuit means including means for deriving voltage and current signals responsive respectively to the voltage and current in said circuit and means including capacitor means for combining these last named voltage and current signals to produce a single signal responsive to changes in said load.

9. A protective system for a prime mover having valve means to arrest the supply of an energy-containing medium thereto, for actuating the valve means at a predetermined abnormal speed of said prime mover to arrest the supply of the energy-containing medium, said protective system comprising a dynamoelectric machine having an output voltage and frequency responsive to the speed of said prime mover, a tuned circuit connected to said output and having a current therein responsive to said voltage and said frequency, said current decreasing with an increase in speed in the vicinity of said abnormal speed, electromagnetic means responsive to a predetermined value of said current, and means responsive to said electromagnetic means for actuating said valve means to arrest the supply of said energy-containing medium to said prime mover.

References Cited in the file of this patent

UNITED STATES PATENTS

| | | |
|---|---|---|
| 701,958 | Steinmetz | June 10, 1902 |
| 742,976 | Ehret | Nov. 3, 1903 |
| 1,621,280 | Roucha | Mar. 3, 1927 |
| 1,670,063 | Darling | May 15, 1928 |
| 1,698,316 | McDonald | Jan. 8, 1929 |
| 1,840,129 | Platzer | Jan. 5, 1932 |
| 2,000,753 | Griscom et al. | May 7, 1935 |
| 2,243,225 | Schwendner | May 27, 1941 |
| 2,388,527 | Crever | Nov. 6, 1945 |
| 2,390,084 | Edwards | Dec. 4, 1945 |
| 2,404,968 | Leyer | July 30, 1946 |